United States Patent [19]
Irvine

[11] Patent Number: 6,125,973
[45] Date of Patent: Oct. 3, 2000

[54] BRAKE PAD HOLDER

[76] Inventor: Mark W. Irvine, 55 Bingham Cir., Sacramento, Calif. 95831

[21] Appl. No.: 09/222,331

[22] Filed: Dec. 29, 1998

[51] Int. Cl.⁷ ....................................................... B62L 3/00
[52] U.S. Cl. ................... 188/24.22; 188/245; 188/250 G
[58] Field of Search ............................... 188/72.7, 24.12, 188/24.22, 73.1, 245, 246, 250 B, 250 D, 250 G

[56] References Cited

U.S. PATENT DOCUMENTS

| | | |
|---|---|---|
| D. 384,018 | 9/1997 | Nishimura . |
| 4,051,924 | 10/1977 | Yoshigai . |
| 4,441,592 | 4/1984 | Everett . |
| 4,444,294 | 4/1984 | Yoshigai . |
| 4,611,692 | 9/1986 | Everett . |
| 4,901,823 | 2/1990 | Chang .................................... 188/73.1 |
| 5,547,046 | 8/1996 | Chen . |
| 5,636,716 | 6/1997 | Sugimoto . |

*Primary Examiner*—Robert J. Oberleitner
*Assistant Examiner*—Pamela J. Lipka
*Attorney, Agent, or Firm*—Pitts & Brittain, P.C.

[57] ABSTRACT

A brake pad holder designed for adjustably mounting a bicycle brake pad to a brake caliper arm. The brake pad holder is designed to maintain the mounting arm thereof in an orthogonal orientation with respect to the brake caliper arm, while the brake pad holder is adjustable in three degrees of motion. The brake pad is removable for repair and replacement thereof, independently from the brake pad mount or other components of the brake pad assembly. The brake pad mount defines a threaded opening for receiving a screw which, when installed, is received within a recess defined by the brake pad. A mounting arm receptor is defined in the bottom wall of the brake pad mount and defines a concave interior configuration which defines a cavity between the mounting arm receptor and the brake pad. A through opening is centrally defined for receiving the mounting arm. The mounting arm is a bolt having a head configured to be received within the cavity defined between the mounting arm receptor and the brake pad. The head defines a lower surface defining a convex configuration to cooperate with the concave mounting arm receptor. A bearing washer is disposed on the exterior of the brake pad mount and defines a concave receptor for receiving the convex exterior of the mounting arm receptor, thus allowing the brake pad mount to move in either of the x-, y- or z-axes, independent of the mounting arm. Flat washers are used as spacers for positioning the braking surface of the brake pad at a selected distance from the wheel rim. A nut is provided for tightening the brake pad mount in a selected orientation.

15 Claims, 3 Drawing Sheets

BRAKE PAD HOLDER

TECHNICAL FIELD

This invention relates to the field of bicycle braking devices. More specifically, the present invention is directed to a device for holding a brake pad on a bicycle brake assembly.

BACKGROUND ART

In the field of bicycles, it is well known that there are many different configurations of wheel rims, brake pad assemblies and brake pad holders. Due to the many configurations of these and other associated parts of bicycles, it is well known that it is desirable to provide some means for adjusting the relative position of the brake pad with respect to the wheel rim. Other factors that render such adjustability desirable include wearing of the brake pad surface, and adjustments in tension in the brake cables for various riding conditions.

Many different brake pad arrangements have been provided in the prior art. Included are unitary brake pads which include a mounting arm integrally formed with a brake pad. Conventionally, the brake pad is fabricated from a material, such as rubber, which yields a relatively high coefficient of friction against the surface of the wheel rim when the brakes are applied. In these unitary constructions, when the brake pad becomes sufficiently worn, the entire device, including the mounting arm, must be replaced. The following U.S. patents are illustrative of the prior art. Several of these disclose devices wherein the mounting arm is fixed relative to the brake pad. Others disclose intricately formed constructions wherein the mounting arm is adjustable relative to the brake pad.

U.S. Pat. No. Des. 384,018 issued to T. Noshimura discloses a design for a cantilever brake for a bicycle. Although not clearly depicted in the figures, it is apparent that the mounting arm and brake pad holder are mounted in a fixed position. Noshimura does not disclose a means for altering the relationship between these two components.

U.S. Pat. No. 4,051,924 issued to K. Yoshigai discloses a device for mounting a brake shoe to a brake of a bicycle. Yoshigai teaches a means for varying the position of the brake shoe with respect to the brake arch similar to that illustrated in Prior Art FIG. 1 described below. However, the '924 device includes a brake shoe in which the mounting arm and brake pad holder are mounted to each other in a fixed relation.

Similar to the previous device, U.S. Pat. No. 4,444,294, also issued to T. Yoshigai, discloses a brake shoe mount which allows adjustability of the brake pad only in one degree of movement. Specifically, the brake pad is rotatable about an axis parallel to the brake pad mounting arm. As in the previous device, the mounting arm is mounted in a fixed position relative to the brake pad.

U.S. Pat. Nos. 4,441, 592 and 4,611,692 issued to R. C. Everett disclose bicycle brake assemblies including a brake pad which has a rigid internal member embedded therein. A mounting arm is received through the internal member and protrudes from the brake pad for mounting the brake pad to a brake assembly. The internal member defines a concave exposed surface circumventing the post. A washer defining a convex surface to cooperate with the internal member concave surface and an opposing flat surface is interposed between the brake pad member and the brake caliper arm. A washer having one flat surface and one concave surface is disposed on an opposite side of the brake caliper arm, and a nut having a convex end to cooperate with the concave side of the second washer is tightened on the brake pad post. The cooperating concave and convex surfaces allow adjustability of the brake pad with respect to the brake caliper arm. As illustrated, the post is fixed relative to the brake pad. Further, the brake pad may not be replaced independently from the post, thereby increasing maintenance costs.

U.S. Pat. No. 4,901,823 issued to M. Chang discloses an adjustable brake pad mount. The brake pad mount includes a mounting arm which is adjustably, yet permanently, mounted onto the brake pad. The mounting arm is a bolt having a head with a top convex surface and a lower concave surface. The interior of the brake pad defines a centrally disposed concave surface to cooperate with the convex upper surface of the mounting arm head. A positioning member defines a convex portion for cooperating with the concave lower service of the mounting arm head. The positioning member is either embedded within the brake pad or permanently secured to exterior of the brake pad. To wit, the brake pad is not replaceable independently of the mounting arm.

U.S. Pat. Nos. 5,547,046 issued to Z. M. Chen and U.S. Pat. No. 5,636,716 issued to M. Sugimoto, et al., each disclose a brake assembly having a means for mounting a brake pad on a brake pad caliper in a manner similar to that illustrated in the Prior Art FIG. 1 described below. The brake pad and mounting arm are fixed relative to each other.

U.S. Pat. No. 5,655,629 issued to S. Takizawa, et al., is a bicycle brake shoe having a brake pad holder, or main body, and a mounting arm, or fixing pin. The mounting arm is mounted to the brake pad holder in a fixed position.

Another type of brake pad holder includes a brake pad mount for removably receiving a brake pad. A typical brake pad holder 100 of this type is illustrated in the Prior Art FIG. 1. A mounting arm 106 is fixed to the brake pad mount 104. The brake pad mount 104 defines a channel for receiving the brake pad 102. The brake pad 102 includes a recessed portion 126 in the underside for receiving a pin (not shown). To this extent, the brake pad mount 102 defines an opening 128 proximate the brake pad recessed portion 126 for cooperating with the pin. The pin defines a length to extend at least partially into the brake pad recessed portion 126 to prevent the brake pad 102 from sliding out of the brake pad mount channel.

A pair of cooperating washers 108,112 is disposed on either side of the brake caliper arm (not shown). Each pair of cooperating washers 108,112 includes one washer 112 having a convex side 114 and another washer 108 having a cooperating concave side 110. The outer sides of each pair of washers 108,112 defines a flat side to abut either of the brake pad mount 106, the brake caliper arm, or a nut 124. Thus, the orientation of the brake pad 102 may be altered with respect to the brake caliper arm as a result of the relative movement between the cooperating pairs of washers 108,112, as illustrated by the arrows 116,118. The nut 124 is secured to the end of the mounting arm 106 in order to secure the brake pad mount 104 once the desired orientation of the brake pad 102 is achieved. However, because the mounting arm 106 is disposed at an acute angle with respect to the brake caliper arm, the brake pad mount 104 has a tendency to loosen after repeated application of the brakes.

The prior art disclosed above does not provide a brake assembly wherein the brake pad orientation is adjustable with respect to the wheel rim, with the mounting arm remaining in an orthogonal orientation with respect to the brake caliper arm, and with the brake pad being independently replaceable.

Therefore, it is an object of this invention to provide a means for adjustably mounting a bicycle brake pad to a brake caliper arm.

Another object of the present invention is to provide such a device whereby the mounting arm of the brake pad mount remains in an orthogonal orientation with respect to the brake caliper arm, while the brake pad holder is adjustable in three degrees of motion.

A further object of the present invention is to provide such a device whereby the brake pad is removable from the brake pad mount.

DISCLOSURE OF THE INVENTION

Other objects and advantages will be accomplished by the present invention which is designed for adjustably mounting a bicycle brake pad to a brake caliper arm. The brake pad holder of the present invention is designed to maintain the mounting arm thereof in an orthogonal orientation with respect to the brake caliper arm of the brake assembly, while the brake pad holder is adjustable in three degrees of motion. Moreover, the brake pad holder is configured such that the brake pad is removable from the brake pad mount for repair and replacement thereof without requiring replacement of the brake pad mount or other components of the brake pad assembly. The brake pad holder includes generally a brake pad mount, on which is removably mounted a brake pad, a mounting arm adjustably received by the brake pad mount, a bearing washer defining a brake pad mount receptor, and a fastener for securing the brake pad holder in a selected orientation.

The brake pad mount is configured to receive a brake pad. The brake pad mount defines a threaded opening for receiving a screw which, when installed, is received within a recess defined by the brake pad. A mounting arm receptor is defined in the bottom wall of the brake pad mount. The mounting arm receptor defines a concave interior configuration which defines a cavity between the mounting arm receptor and the brake pad. A through opening is centrally defined for receiving the mounting arm. The mounting arm is a bolt having a head configured to be received within the cavity defined between the mounting arm receptor and the brake pad. The head defines a lower surface defining a convex configuration to cooperate with the concave mounting arm receptor.

A bearing washer is disposed on the exterior of the brake pad mount and receives the mounting arm. The bearing washer defines a concave receptor for receiving the convex exterior of the mounting arm receptor. The convex/concave configuration allows the brake pad mount to move in either of the x-, y- or z-axes, independent of the mounting arm. The bearing washer defines a flat side opposite the concave receptor for engaging a flat washer, a spacer, or the brake caliper arm. Thus, despite movement of the brake pad mount during positioning thereof, the bearing washer remains relatively stationary.

Flat washers are used as spacers for positioning the braking surface of the brake pad at a selected distance from the wheel rim. A nut is provided for tightening the brake pad mount in a selected orientation.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A brake pad holder incorporating various features of the present invention is illustrated generally at 10 in the figures. The brake pad holder 10 is designed for adjustably mounting a bicycle brake pad 12 to a brake caliper arm (not shown). The brake pad holder 10 of the present invention is designed to maintain the mounting arm 18 thereof in an orthogonal orientation with respect to the brake caliper arm of the brake assembly, while the brake pad mount 28 is adjustable in three degrees of motion. Moreover, the brake pad holder 10 is configured such that the brake pad 12 is removable from the brake pad mount 28 for repair and replacement thereof without requiring replacement of the brake pad mount 28 or other components of the brake pad assembly.

Figure 1:
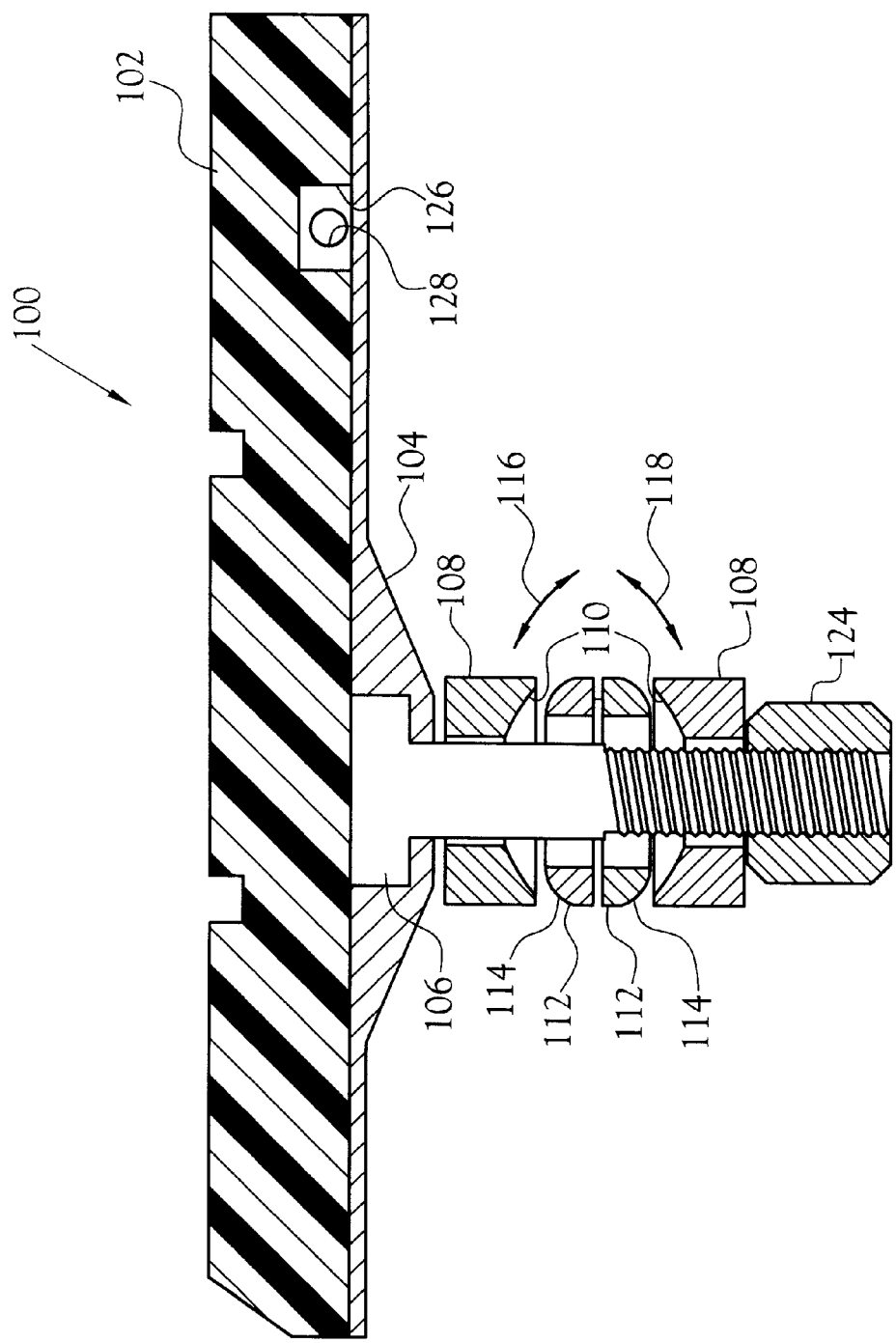
FIG. 1 is an elevation view, in cross-section, of a prior art brake pad holder.
Figure 2:
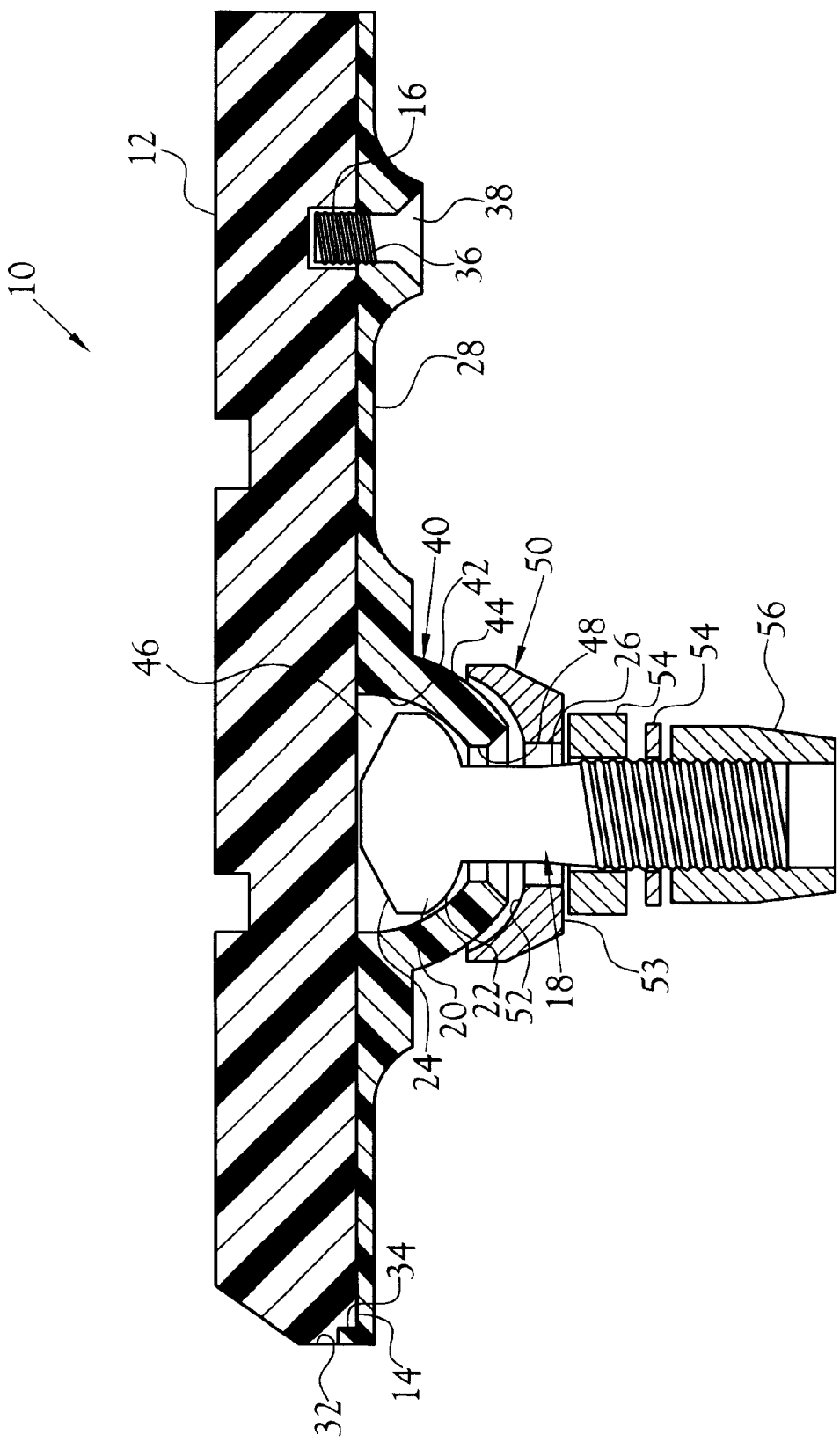
FIG. 2 is an elevation view, in cross-section, of the brake pad holder of the present invention.
Figure 3:
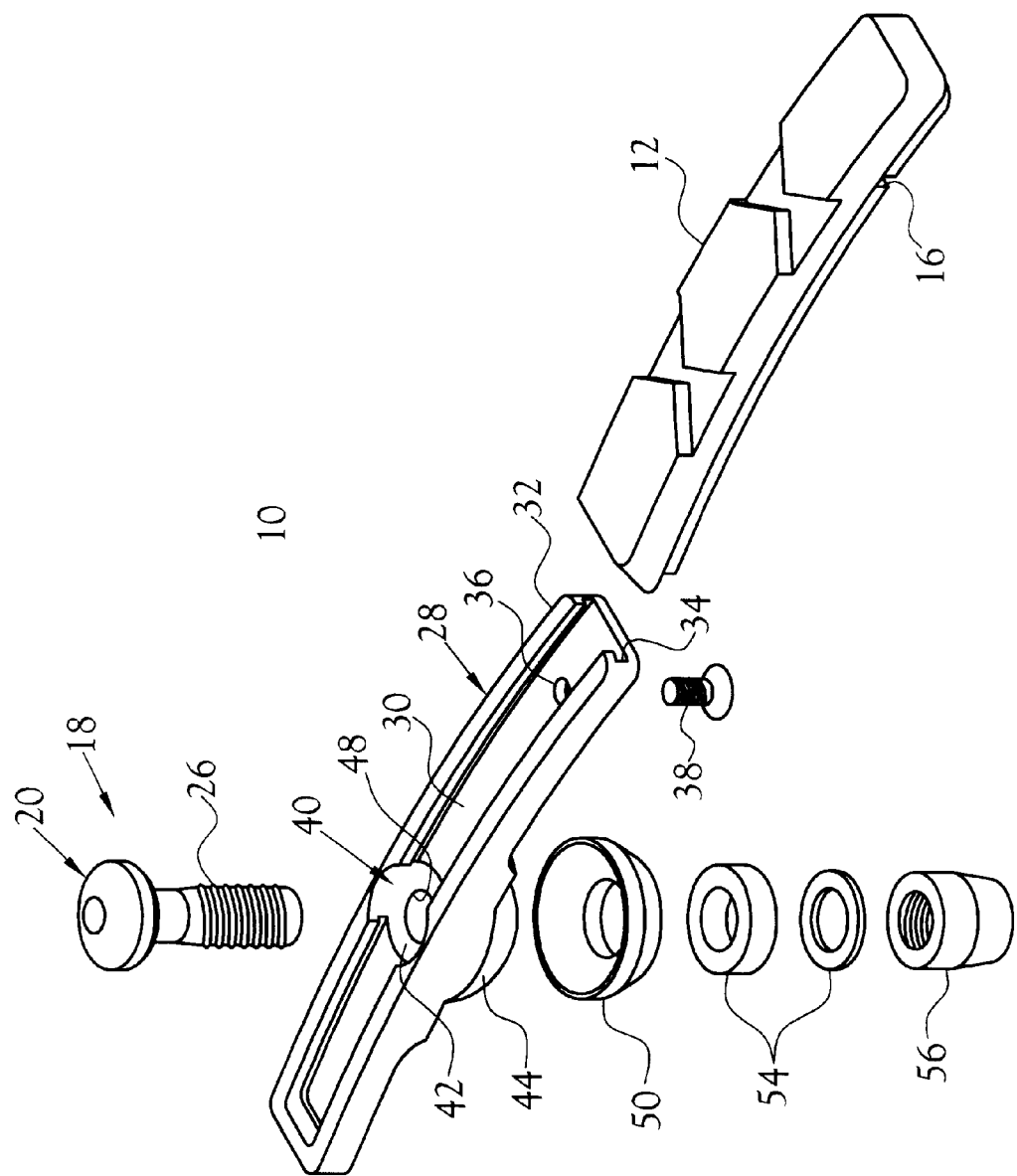
FIG. 3 is an exploded perspective view of the brake pad holder of the present invention showing the various components of the present invention.

Illustrated in FIG. 2 is an elevation view, in cross-section, of the brake pad holder 10 of the present invention. An exploded view of the brake pad holder 10 of the present invention is illustrated in FIG. 3, which more clearly illustrates several features of the present invention. The brake pad holder 10 includes generally a brake pad mount 28, on which is removably mounted a brake pad 12, a mounting arm 18 adjustably received by the brake pad mount 28, a bearing washer 50 defining a brake pad mount receptor 52, and a fastener 56 for securing the brake pad mount 28 in a selected orientation.

The brake pad mount 28 defines a substantially elongated configuration with a slotted channel 30 configured to receive a brake pad 12. To this extent, the slotted channel 30 is defined by a side wall 32 about both sides and one end thereof, the side wall 32 defining an inwardly extending groove 34. The brake pad 12 defines a tab 14 about its perimeter, the tab 14 being closely received in the side wall groove 34 as the brake pad 12 is slid into position. The brake pad mount 28 further defines a threaded opening 36 for receiving a screw 38. The threaded opening 36 is preferably defined proximate the open end of the slotted channel 30, but it will be seen by those skilled in the art that it may be defined at any selected location. The brake pad 12 defines a notch 16 in the bottom surface thereof at a location corresponding to the brake pad mount threaded opening 36 such that when a screw 38 is received in the threaded opening 36, the terminal portion of the screw 38 is received within the brake pad notch 16. Thus, the brake pad 12 is prevented from unselected removal.

A mounting arm receptor 40 is defined in the bottom wall of the brake pad mount 28. The mounting arm receptor 40 defines a concave interior 42 configuration and a convex exterior 44 configuration. Due to the concave interior 42, a cavity is defined between the mounting arm receptor 40 and the brake pad 12. A through opening 48 centrally defined for receiving the mounting arm 18.

The mounting arm 18 is a bolt having a head 20 configured to be received within the cavity 46 defined between the mounting arm receptor 40 and the brake pad 12. The head 20 defines a lower surface 22 defining a convex configuration to cooperate with the concave interior 42 of the mounting arm receptor 40. An upper surface 24 of the mounting arm head 20 defines a substantially convex configuration. In the illustrated embodiment, the mounting arm head upper surface 24 is frusto-conical such that as the orientation of the brake pad mount 28 is adjusted with respect to the mounting arm 18, the mounting arm head 20 does not interfere with the brake pad 12. Specifically, at any orientation of the brake pad mount 28, the mounting arm head 20 remains within the cavity 46. The mounting arm 18 further defines a threaded post 26 having a diameter smaller than the mounting arm receptor through opening 48 to allow the brake pad mount 28 to be selectively positioned.

A bearing washer 50 is disposed on the exterior of the brake pad mount 28 and receives the mounting arm threaded post 26. The bearing washer 50 defines a concave receptor 52 for receiving the convex exterior 44 of the mounting arm receptor 40. The convex/concave configuration allows the brake pad mount 28 to move in either of the x-, y- or z-axes, independent of the mounting arm 18. The bearing washer 50 defines a flat side 53 opposite the concave receptor 52 for engaging a flat washer 54, a spacer, or the brake caliper arm. Thus, despite movement of the brake pad mount 28 during positioning thereof, the bearing washer 50 remains relatively stationary.

Illustrated are two flat washers 54 disposed beneath the bearing washer 50. These flat washers 54 are used as spacers for positioning the braking surface of the brake pad 12 at a selected distance from the wheel rim (not shown). For example, the brake caliper arm in the illustrated embodiment may be positioned between the bearing washer 50 and the first flat washer 54, between the two flat washers 54, or below the second flat washer 54. More or fewer flat washers 54 may be employed, and washers 54 of varying thicknesses may likewise be employed. A nut 56 is provided for tightening the brake pad mount 28 in a selected orientation.

From a fully dismantled brake pad holder 10 as illustrated in FIG. 3, installation of the brake pad holder 10 of the present invention is as follows. The mounting arm threaded post 26 is inserted into the through opening 48 defined by the mounting arm receptor 40 in the brake pad mount 28. The brake pad 12 is slipped into place in the slotted channel 30 and the screw 38 is installed in the threaded opening 48. Thus, the brake pad 12 remains in position, as is the mounting arm 18. The bearing washer 50 is then placed over the mounting arm threaded post 26 such that the concave side 52 thereof is placed over the convex portion 44 of the mounting arm receptor 40. The desired number and thicknesses of flat washers 54 are then placed over the mounting arm threaded post 26. The mounting arm threaded post 26 is then inserted into the appropriate opening in a conventional brake caliper arm. Again, the desired number and thicknesses of flat washers 54 are placed over the mounting arm threaded post 26 and the nut 56 is loosely screwed onto the threaded post 26. The brake pad mount 28 is then oriented into the preferred position and the nut 56 is tightened. In order to adjust the orientation of the brake pad mount 28, the nut 56 is loosened, the brake pad mount 28 is repositioned, and the nut 56 is again tightened. To replace the brake pad 12, the nut 56 is loosened and the brake pad mount 28 is positioned to expose the screw 38. If necessary, the brake pad holder 10 may be removed from the brake caliper arm. After replacement of the brake pad 12, the screw 38 is installed and the brake pad mount 28 positioned and tightened into place as described.

From the foregoing description, it will be recognized by those skilled in the art that a brake pad holder offering advantages over the prior art has been provided. Specifically, the brake pad holder is designed for adjustably mounting a bicycle brake pad to a brake caliper arm, the mounting arm thereof being maintained in an orthogonal orientation with respect to the brake caliper arm of the brake assembly, while the brake pad holder is adjustable in three degrees of motion. Further, the brake pad holder is configured such that the brake pad is removable from the brake pad mount for repair and replacement thereof without requiring replacement of the brake pad mount or other components of the brake pad assembly.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. A brake pad holder comprising:

a brake pad mount for removably receiving a brake pad, said brake pad mount defining a mounting arm receptor in a bottom wall thereof, said mounting arm receptor defining a concave interior configuration and a convex exterior configuration, a cavity being defined between said mounting arm receptor and said brake pad, said mounting arm receptor further defining a centrally-disposed through opening;

a securement device for securing said brake pad to said brake pad mount;

a mounting arm having a head and a threaded post, said head being configured to be received within said cavity defined between said mounting arm receptor and said brake pad, said head having a lower surface defining a convex configuration to cooperate with said concave interior of said mounting arm receptor, said threaded post being received through said mounting arm receptor through opening and defining a diameter smaller than said mounting arm receptor through opening to allow selective orientation of said brake pad mount independently from said mounting arm;

a bearing washer defining a brake pad mount receptor, said bearing washer defining a concave receptor for receiving said convex exterior of said mounting arm receptor, cooperation of said concave receptor and said mounting arm receptor convex exterior allowing movement of said brake pad mount along an x-axis, a y-axis and a z-axis, independent of said mounting arm, said bearing washer defining a flat side opposite said concave receptor; and a fastener for securing said brake pad holder in a selected orientation.

2. The brake pad holder of claim 1 wherein said brake pad mount defines a substantially elongated configuration with a slotted channel configured to receive said brake pad, said brake pad defining a tab about a perimeter thereof, said tab being closely received in said slotted channel of said brake pad mount.

3. The brake pad holder of claim 1 wherein said securement device is a screw, wherein said brake pad mount defines a threaded opening for receiving said screw, and wherein said brake pad defines a notch in a bottom surface thereof at a location corresponding to said brake pad mount threaded opening such that when said screw is received in said threaded opening, a terminal portion of said screw is received within said brake pad notch.

4. The brake pad holder of claim 1 wherein an upper surface of said mounting arm head defines a substantially convex configuration such that when said brake pad mount is adjusted, said mounting arm head remains substantially within said cavity defined between said mounting arm receptor and said brake pad.

5. The brake pad holder of claim 1 wherein said fastener for securing said brake pad holder in a selected orientation is a nut threadably received on said mounting arm.

6. The brake pad holder of claim 1 further comprising at least one spacer for selectively positioning said brake pad at a selected distance from a conventional brake caliper arm.

7. The brake pad holder of claim 6 wherein said at least one spacer is disposed between said bearing washer and said brake caliper arm.

8. The brake pad holder of claim 6 wherein said at least one spacer is disposed between said brake caliper arm and said fastener for securing said brake pad holder in a selected orientation.

9. The brake pad holder of claim 6 wherein at least one said spacer is disposed between said bearing washer and said brake caliper arm, and wherein at least one said spacer is disposed between said brake caliper arm and said fastener for securing said brake pad holder in a selected orientation.

10. A brake pad holder comprising:

a brake pad mount for removably receiving a brake pad, said brake pad mount defining a mounting arm receptor in a bottom wall thereof, said mounting arm receptor defining a concave interior configuration and a convex exterior configuration, a cavity being defined between said mounting arm receptor and said brake pad, said mounting arm receptor further defining a centrally-disposed through opening, said brake pad mount defining a threaded opening in a bottom wall thereof, said brake pad defining a notch in a bottom surface thereof at a location corresponding to said brake pad mount threaded opening;

a securement device for securing said brake pad to said brake pad mount, said securement device being a screw configured to cooperate with said brake pad mount threaded opening such that when said screw is received in said threaded opening, a terminal portion of said screw is received within said brake pad notch;

a mounting arm having a head and a threaded post, said head being configured to be received within said cavity defined between said mounting arm receptor and said brake pad, said head having a lower surface defining a convex configuration to cooperate with said concave interior of said mounting arm receptor, an upper surface of said mounting arm head defining a substantially convex configuration such that when said brake pad mount is adjusted, said mounting arm head remains substantially within said cavity defined between said mounting arm receptor and said brake pad, said threaded post being received through said mounting arm receptor through opening and defining a diameter smaller than said mounting arm receptor through opening to allow selective orientation of said brake pad mount independently from said mounting arm;

a bearing washer defining a brake pad mount receptor, said bearing washer defining a concave receptor for receiving said convex exterior of said mounting arm receptor, cooperation of said concave receptor and said mounting arm receptor convex exterior allowing movement of said brake pad mount along an x-axis, a y-axis and a z-axis, independent of said mounting arm, said bearing washer defining a flat side opposite said concave receptor;

a fastener for securing said brake pad holder in a selected orientation; and at least one spacer for selectively positioning said brake pad at a selected distance from a conventional brake caliper arm.

11. The brake pad holder of claim 10 wherein said brake pad mount defines a substantially elongated configuration with a slotted channel configured to receive said brake pad, said brake pad defining a tab about a perimeter thereof, said tab being closely received in said slotted channel of said brake pad mount.

12. The brake pad holder of claim 10 wherein said fastener for securing said brake pad holder in a selected orientation is a nut threadably received on said mounting arm.

13. The brake pad holder of claim 10 wherein said at least one spacer is disposed between said bearing washer and said brake caliper arm.

14. The brake pad holder of claim 10 wherein said at least one spacer is disposed between said brake caliper arm and said fastener for securing said brake pad holder in a selected orientation.

15. The brake pad holder of claim 10 wherein at least one said spacer is disposed between said bearing washer and said brake caliper arm, and wherein at least one said spacer is disposed between said brake caliper arm and said fastener for securing said brake pad holder in a selected orientation.

* * * * *

(12) EX PARTE REEXAMINATION CERTIFICATE (5602nd)
United States Patent
Irvine

(10) Number: US 6,125,973 C1
(45) Certificate Issued: Nov. 7, 2006

(54) BRAKE PAD HOLDER

(76) Inventor: Mark W. Irvine, 55 Bingham Cir., Sacramento, CA (US) 95831

Reexamination Request:
No. 90/007,038, May 11, 2004

Reexamination Certificate for:
Patent No.: 6,125,973
Issued: Oct. 3, 2000
Appl. No.: 09/222,331
Filed: Dec. 29, 1998

(51) Int. Cl.
*B62L 3/00* (2006.01)

(52) U.S. Cl. .................. 188/24.22; 188/245; 188/250 G
(58) Field of Classification Search .................. None
See application file for complete search history.

(56) References Cited

U.S. PATENT DOCUMENTS 4,901,823 A 2/1990 Chang

FOREIGN PATENT DOCUMENTS

EP 0799762 A2 10/1997
JP 52-160782 U1 12/1977

OTHER PUBLICATIONS

'96 Shimano Bicycle System Components Dealer Sales & Support Manual, Aug. 1995; 4 pages.

*Primary Examiner*—Matthew C. Graham

(57) ABSTRACT

A brake pad holder designed for adjustably mounting a bicycle brake pad to a brake caliper arm. The brake pad holder is designed to maintain the mounting arm thereof in an orthogonal orientation with respect to the brake caliper arm, while the brake pad holder is adjustable in three degrees of motion. The brake pad is removable for repair and replacement thereof, independently from the brake pad mount or other components of the brake pad assembly. The brake pad mount defines a threaded opening for receiving a screw which, when installed, is received within a recess defined by the brake pad. A mounting arm receptor is defined in the bottom wall of the brake pad mount and defines a concave interior configuration which defines a cavity between the mounting arm receptor and the brake pad. A through opening is centrally defined for receiving the mounting arm. The mounting arm is a bolt having a head configured to be received within the cavity defined between the mounting arm receptor and the brake pad. The head defines a lower surface defining a convex configuration to cooperate with the concave mounting arm receptor. A bearing washer is disposed on the exterior of the brake pad mount and defines a concave receptor for receiving the convex exterior of the mounting arm receptor, thus allowing the brake pad mount to move in either of the x-, y- or z-axes, independent of the mounting arm. Flat washers are used as spacers for positioning the braking surface of the brake pad at a selected distance from the wheel rim. A nut is provided for tightening the brake pad mount in a selected orientation.

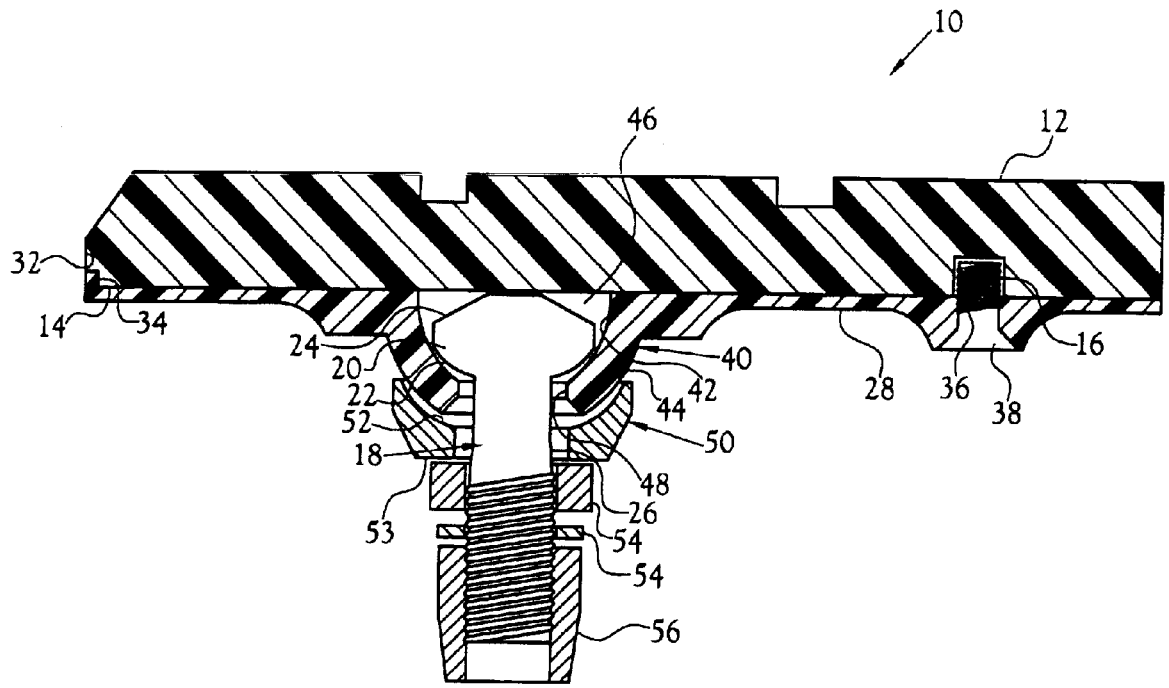

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–15 are cancelled.

* * * * *